United States Patent [19]

Kamada

[11] Patent Number: 5,662,551
[45] Date of Patent: Sep. 2, 1997

[54] GEAR SHIFT CONTROL SYSTEM FOR AUTOMATIC TRANSMISSION

[75] Inventor: Shinya Kamada, Hiroshima, Japan

[73] Assignee: Mazda Motor Corporation, Hiroshima, Japan

[21] Appl. No.: 157,261

[22] Filed: Nov. 26, 1993

[30] Foreign Application Priority Data

Nov. 26, 1992 [JP] Japan .................................. 4-341499

[51] Int. Cl.$^6$ .................................................. F16H 59/00
[52] U.S. Cl. ............................................ 477/152; 477/155
[58] Field of Search ................................. 477/143, 150, 477/152, 155

[56] References Cited

U.S. PATENT DOCUMENTS 4,981,053  1/1991  Yamaguchi ............................. 477/163
5,063,814  11/1991 Baba et al. ............................ 475/155 X
5,133,230  7/1992  Ito et al. ............................... 475/155 X

FOREIGN PATENT DOCUMENTS 63-3183   1/1988  Japan .
2120652   5/1990  Japan ..................................... 477/155

*Primary Examiner*—Charles A. Marmor
*Assistant Examiner*—Nathan O. Jensen

[57] ABSTRACT

An automatic transmission gear shift control system controls a transitional pressure level during a gear shift according to engine output conditions and correctively changes a rate at which the transitional pressure changes according to a time difference between an actual gear shift time and a target gear shift time when an engine output is less than a specified level. If the corrected rate is greater than a specified rate, then the transitional pressure level is increased. According to the control system, even when a drop in the transitional pressure does not cause a change in shifting time, a shifting time learning control is properly conducted.

11 Claims, 11 Drawing Sheets

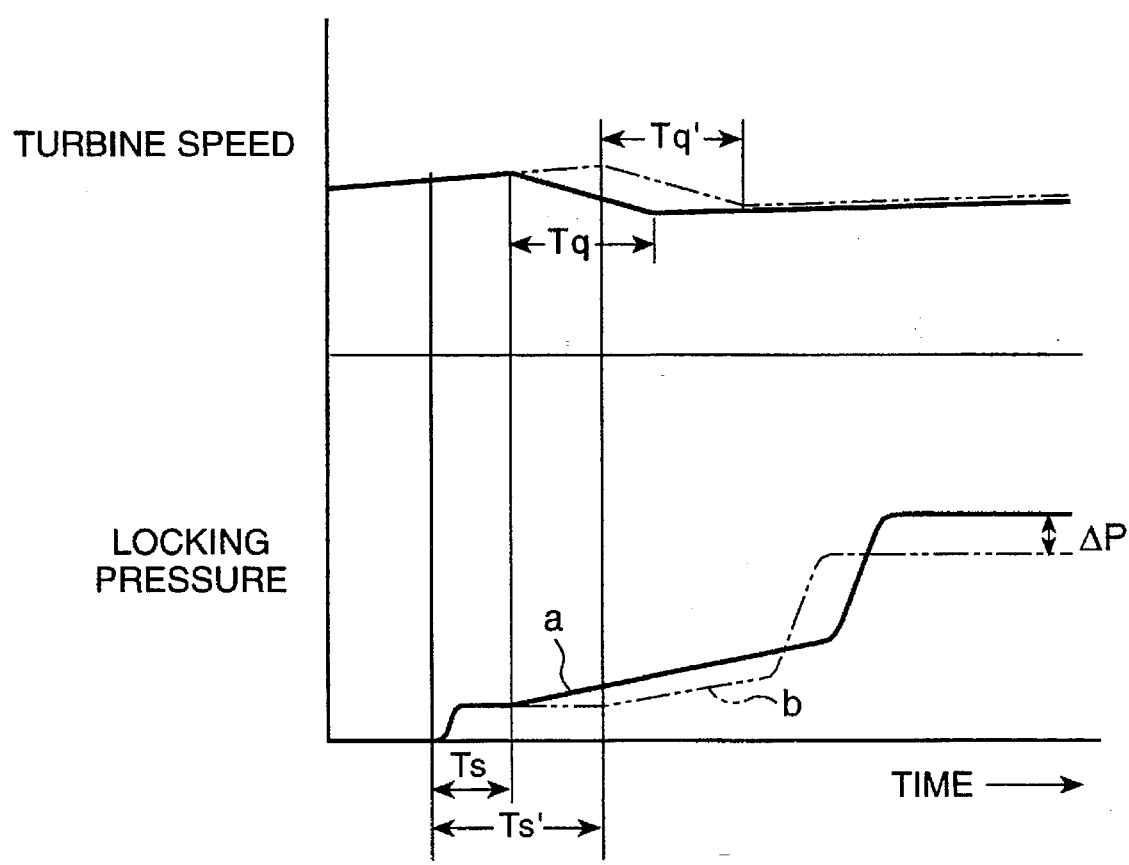

GEAR SHIFT CONTROL SYSTEM FOR AUTOMATIC TRANSMISSION

BACKGROUND OF THE INVENTION

1. Field of the Invention

The present invention relates to a gear shift control system for an automatic transmission for an automobile and, more specifically, to an automatic transmission gear shift control system which varies an upward and downward change in the locking pressure applied to frictional coupling elements according to driving conditions during gear shifting.

2. Description of Related Art

Typically, automatic transmissions for automobiles combine a torque converter and a transmission gear mechanism provided with a plurality of frictional coupling elements, such as brakes and clutches, which are selectively locked and unlocked to automatically switch the torque transmission paths according to driving conditions in order to provide desired gears. Locking and unlocking of these frictional coupling elements is controlled by a hydraulic control circuit. This hydraulic control circuit includes a regulator valve for regulating hydraulic line pressure discharged from a hydraulic pump to a specified pressure level, a manually operated shift valve for placing the automatic transmission into a selected one of available ranges of the automatic transmission, and a plurality of shift valves for selectively actuating pressure lines in communication with actuators for the frictional coupling elements. Further, a duty solenoid valve may be installed in the hydraulic circuit so as to vary the regulated level of line pressure according to driving conditions defined by, for instance, engine throttle openings.

In order for such an automatic transmission to alleviate shift shocks, the line pressure or locking pressure applied to selected frictional coupling elements is varied such that it rises via what is called a "transitional level of pressure" which is between an initial pressure level and a target pressure level and at which the line pressure is intentionally maintained for a while. For this purpose, the hydraulic control circuit includes accumulators located between the shift valve and pressure lines in communication with actuators for selected frictional coupling elements for developing a desired level or state of transitional line pressure. Such an automatic transmission control system is known from, for instance, Japanese Patent Publication No. 63-3183. In a case in which the level of transitional line pressure is too high during gear shifting, a very short shifting time is required for the automatic transmission to complete gear shifting and consequently, enhanced shift shocks occur. Contradistinctively, in a case in which the level of transitional line pressure is too low during gear shifting, the frictional coupling elements tend to slip unnecessarily and prolong a shifting time so as not only to deteriorate the feeling of gear shifting but also to lower the durability of operation thereof. For this reason, the transitional level of pressure is desirably set so as to complete gear shifting of the automatic transmission in a short time without being accompanied by immoderate shift shocks. However, in spite of keeping the transitional level of pressure unchanged, the shifting time practically changes due to various causes, such as changes in the frictional coefficients of frictional coupling elements and the deterioration in the viscosity of a working hydraulic oil in the hydraulic control circuit.

In an attempt to settle the difficulties, a learning control may be conducted in the transmission gear shift control system. For example, the automatic transmission control system described in the above-mentioned publication has a configuration in which, if an actual shifting time for a current gear shifting is different from a target shifting time, the level of line pressure is corrected so as to complete a next gear shifting within the target shifting time. In this instance, in order for the automatic transmission to prevent the prolongation of shifting time, the line pressure is corrected downward if the actual shifting time is shorter than the target shifting time and, on the other hand, is corrected upward if it is longer than the target shifting time.

However, with regard to this type of automatic transmission, the learning control of pressure level for locking or line pressure causes slippage of the frictional coupling element and a deteriorated response of the frictional coupling element.

To understand the drawback of the prior art automatic transmissions, reference is made to FIG. 13. In an automatic transmission control system which changes the transitional pressure level during a gear shift according to engine operating conditions, such as an engine throttle valve opening, the transitional pressure level is set approximately to an initial pressure level "a" as shown in FIG. 13. At this initial pressure level, an actuator for the frictional coupling element commences to operate so as to cause gentle locking of the frictional coupling element in the event that the engine throttle opening is small.

If a shifting time Tq, which is the time required to complete a gear shift after the gear shift is started, is shorter than a target shifting time, the learning control takes place so as to correctively change the line pressure downward for another gear shift. In this event, even if a pressure drop P in line pressure occurs as shown by line "b," what takes place in the other gear shift is only that a time Ts from the appearance of a shift command signal to the development of actuator pressure to the initial level is extended to a time Ts' as indicated by line "b." In other words, the gradient at which the transitional pressure level rises is not changed. Consequently, the shifting time Tq' for the other gear shift is approximately equal to the shifting time Tq for the previous gear shift. Unless there is caused a change in shifting time, the learning control lowers continuously the line pressure, resulting in allowing the frictional coupling element to slip and induce the deterioration of responsiveness.

SUMMARY OF THE INVENTION

It is an object of the present invention to provide a gear shift control system for an automobile automatic transmission which provides a learning control for changing a shifting time properly.

The above object of the present invention is achieved by providing a gear shift control system for an automatic transmission having a plurality of hydraulically operated frictional elements which are selectively locked and unlocked to automatically perform gear shifts. A locking pressure, which is changed according to engine output condition, is gradually increased at a rate so as to lock a frictional coupling element, thereby causing a specific gear shift without shift shock. When an engine output is less than a specified engine output, the increasing rate of locking pressure is correctively changed in learning control according to a shifting time difference between an actual shifting time and a target shifting time so as to cause another gear shift for the target shifting time. This pressure increasing rate correction is conducted only when the rate is less than a predetermined rate. Further, when an engine output is greater than the specified engine output, an initial pressure level from which the locking pressure is gradually increased is correctively changed according to the shifting time difference so as to cause another specific gear shift for the target shifting time.

With the automatic transmission gear shift control system having a configuration in accordance with the present invention, when engine output is less than a specified level, the increasing rate of locking pressure is corrected according to a shifting time, so that even when a drop in transitional pressure does not cause a change in shifting time, a learning control of shifting time is properly conducted. On the other hand, when engine output is greater than the specified level, the initial level of locking pressure is corrected according to a shifting time, so that a gear shift is performed smoothly without being accompanied by fluctuations of output torque in an inertia phase in a second half of gear shifting.

Furthermore, since when the pressure increasing rate is greater than a predetermined rate, the learning corrective control of the rate is not conducted even when the engine output is less than the specified level, a gear shift is performed smoothly without being accompanied by fluctuations of output torque in an inertia phase in a second half of gear shifting.

BRIEF DESCRIPTION OF THE DRAWINGS

The above and other objects and features of this invention will be clearly understood from the following description with respect to a preferred embodiment thereof presented by way of example when considered in conjunction with the accompanying drawings, in which:

FIG. 13 is a time chart for explaining a prior art pressure control.

DETAILED DESCRIPTION OF PREFERRED EMBODIMENTS

Figure 1:
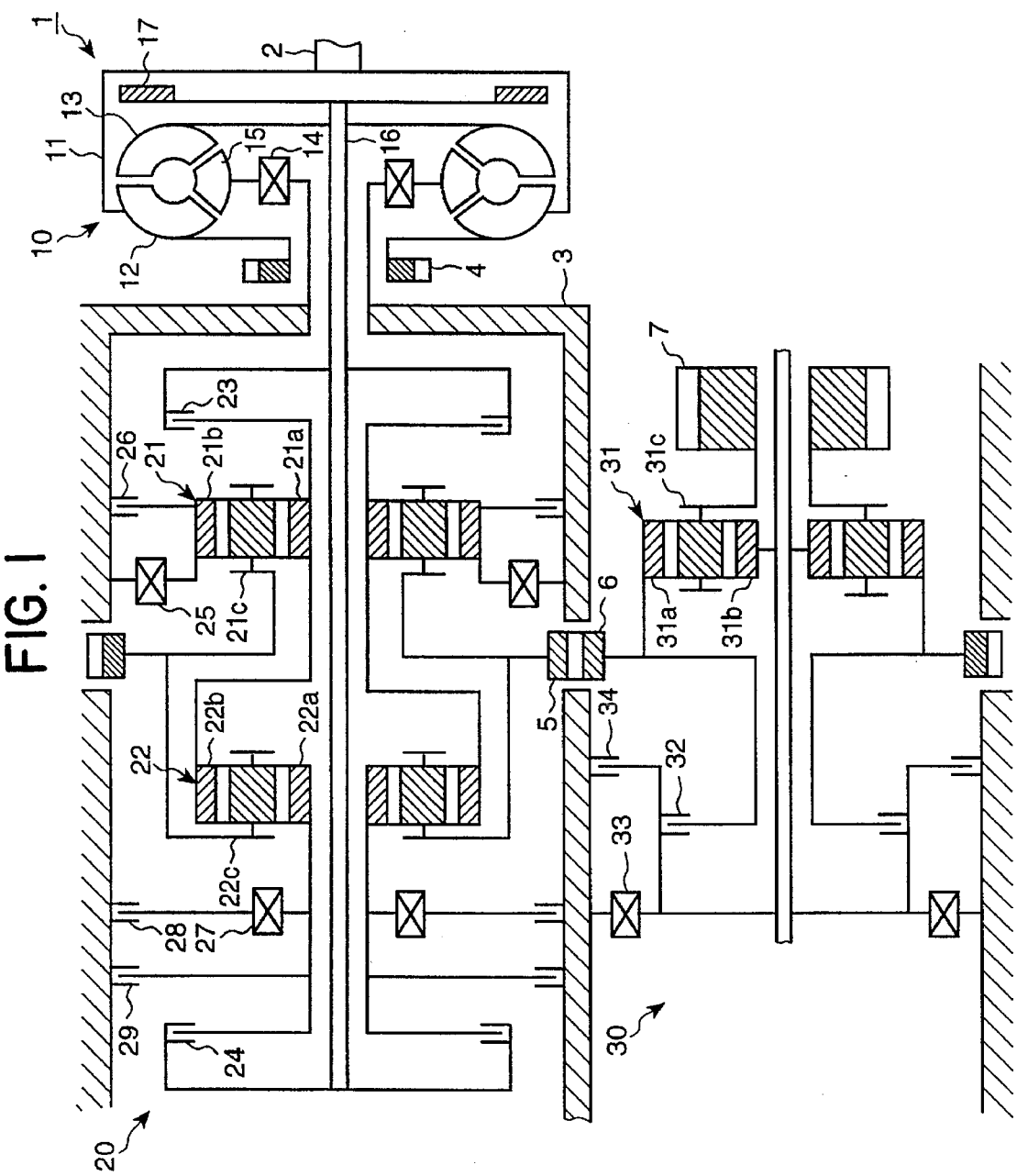
FIG. 1 is a schematic illustration of an automatic transmission cooperating with a gear shift control system in accordance with a preferred embodiment of the present invention.

Referring to the drawings in detail, and, in particular, to FIG. 1, an automatic transmission 1 cooperating with a gear shift control system in accordance with a preferred embodiment of the present invention includes as its main components a torque converter 10, a first or primary transmission gear mechanism 20 disposed coaxially with the torque converter 10, and a second or secondary transmission gear mechanism 30 disposed adjacent to and in parallel with the primary transmission gear mechanism 20.

The torque converter 10 is composed of a pump 12 secured inside of a converter casing 11 fixedly connected to an engine output shaft 2, such as a crankshaft, a turbine 13 driven with hydraulic oil by the pump 12 and arranged adjoining the pump 12, a stator 15 disposed between the pump 12 and turbine 13 and supported by a transmission casing 3 through a one-way clutch 14, a turbine shaft 16, and a lock-up clutch 17 for mechanically coupling the engine output shaft 2 and the turbine 13 together via the converter casing 11. The rotation of turbine 13 is transmitted to the primary transmission gear mechanism 20 via a turbine shaft 16. A hydraulic pump 4, such as an oil pump, is installed between the torque converter 10 and the primary transmission gear mechanism 20 and is driven by an engine (not shown) through the engine output shaft 2.

The transmission gear mechanism 30 is composed of two, namely front and rear, planetary gear sets 21 and 22 disposed coaxially with each other. The turbine shaft 16 is operationally connected to the front planetary gear set 21a through its sun gear 21 by means of a forward clutch (FWD CLT) 23. Further, the turbine shaft 16 is operationally connected to the rear planetary gear set 22 through its sun gear 22a by means of a primary direct coupling clutch (DCT CLT) 24. The front planetary gear set 21 is provided with a first one-way clutch (1st OWY CLT) 25 and a low reverse brake (RVS BRK) 26 interposed in parallel with respect to and between the transmission casing 3 and the ring gear 21b of front planetary gear set 21. Further, there are provided a second one-way clutch (2nd OWY CLT) 27 and a 3–4 brake (3–4 BRK) 28 interposed in series between the transmission casing 3 and the sun gear 22b of rear planetary gear set 22, and a coast brake (CST BRK) 29 in parallel with respect to the 2nd one-way clutch 27 and 3–4 brake 28. These front and rear planetary gear sets 21 and 22 are operationally coupled to each other by means of the engagement of the sun gear 21a of front planetary gear set 21 and a ring gear 22b of rear planetary gear set 22 and the engagement of pinion carriers 21c and 22c of front and rear planetary gear sets 21 and 22. However, when the coupling clutch (DCT CLT) 24 is actuated, these front and rear planetary gear sets 21 and 22 are mechanically coupled together. Primary transmission gear mechanism 20 has an output gear 5 in engagement with the pinion carriers 21c and 22c of front and rear planetary gear sets 21 and 22. By means of selective coupling of the forward clutch 23, primary direct coupling clutch 24, low reverse brake 26 and 3–4 brake 28, the primary transmission gear mechanism 20 places the automatic transmission 1 into one of available gears, i.e. a low speed forward gear, a middle speed forward gear, a high speed forward gear, and a reverse gear.

Secondary transmission gear mechanism 30 is composed of a single planetary gear set 31 provided with an input gear 6 and is operationally coupled to primary transmission gear mechanism 20 by means of the engagement of the output gear 5 and the input gear 6. This planetary gear set 31 has a ring gear 31a with which the input gear 6 is engaged, a sun gear 31b and a pinion carrier 31c. There are provided in the secondary transmission gear mechanism 30 a secondary direct coupling clutch (DCT CLT) 32 disposed between these ring gear 31a and sun gear 31b, and a 3rd one-way clutch (3rd OWY CLT) 33 and a speed reduction brake 34 (RDT BRK) 34 interposed in parallel with respect to and between the transmission casing 3 and the sun gear 21b of planetary gear set 31. Secondary transmission gear mechanism 30 is provided with a transmission output gear 7, connected to the pinion carrier 31c of planetary gear set 31, through which the transmission output torque is transmitted to drive wheels (not shown) via a differential. Such a differential may take any type well known to those skilled in the art.

Secondary transmission gear mechanism 30 thus configured places the automatic transmission into one of two available forward gears, i.e. a low speed forward gear and a single reverse gear. In this instance, the automatic transmission 1 is designed and adapted to enable selections of five out of the six speed forward gears. Operations of various clutches and brakes are indicated in Table I in which the individual frictional coupling element is brought into coupling in the respective gears marked with an asterisk and in particular in a range in which engine braking is available if an asterisk is in parentheses.

TABLE I

Primary Transmission Gear Mechanism

| Gear | DRT CLT | FWD CLT | 3-4 BRK | CST BRK | RVS BRK | 1st OWY CLT | 2ND OW CLT |
| --- | --- | --- | --- | --- | --- | --- | --- |
| 1st Low Speed | | ○ | | | (○) | Lock | Free |
| 2nd Low Speed | | ○ | | | (○) | Lock | Free |
| 3rd Middle Speed | | ○ | ○ | ○ | | Free | Lock |
| 4th Middle Speed | | ○ | ○ | ○ | | Free | Lock |
| 5th High Speed | ○ | ○ | ○ | | | Free | Free |
| Reverse | ○ | | | | ○ | Free | Free |

Secondary Transmission Gear Mechanism

| Gear | DRT CLT | FWD CLT | 2ND OW CLT |
| --- | --- | --- | --- |
| 1st Low Speed | | ○ | Lock |
| 2nd Low Speed | ○ | | Free |
| 3rd Middle Speed | | ○ | Lock |
| 4th Middle Speed | ○ | | Free |
| 5th High Speed | ○ | | Free |
| Reverse | | ○ | Free | high speed forward gear. Specifically, when the secondary direct coupling clutch 32 is unlocked, the sun gear 31b of planetary gear set 31 of secondary transmission gear mechanism 30 is locked with respect to transmission casing 3 by means of the 3rd one-way clutch 33 or the speed reduction brake 34. Then, the torque transmitted to the ring gear 31a from the input gear 6 is reduced and transmitted to the transmission output gear 7 via the pinion carrier 31c, and as a result, the secondary transmission gear mechanism 30 provides a low speed gear. In this instance, if the speed reduction brake 34 has been locked, secondary transmission gear mechanism 30 functions to apply engine braking. Further, when the secondary direct coupling clutch 32 is locked while the speed reduction brake 34 has been unlocked, the ring gear 31a and sun gear 31b of planetary gear set 31 are brought into engagement with each other, so that the secondary transmission gear mechanism 30 connects the transmission of torque directly to the transmission output gear 7 from the input gear 6 via the pinion carrier 31c, thereby providing a high speed forward gear.

In such a way as described above, since primary transmission gear mechanism 20 provides three forward gears, i.e. high, middle and low speed forward gear, and secondary transmission gear mechanism 30 provides two forward gears, i.e. high and low speed forward gears, the automatic transmission 1 is selectively placed as one whole into six forward gears. Further, by the combination of primary transmission gear mechanism 20 providing the reverse gear and secondary transmission gear mechanism 30 providing the low speed gear with the speed reduction brake 34 locked, the automatic transmission 1 is placed as one whole into a In order to selectively place the automatic transmission 1 into the 1st to 6th forward gears and the reverse gear according to driving conditions or driver's demands, a hydraulic control circuit 40 selectively operates hydraulic actuators so as to selectively lock and unlock the various clutches and brakes according to the operational patterns indicated in Table I.

Figure 2:
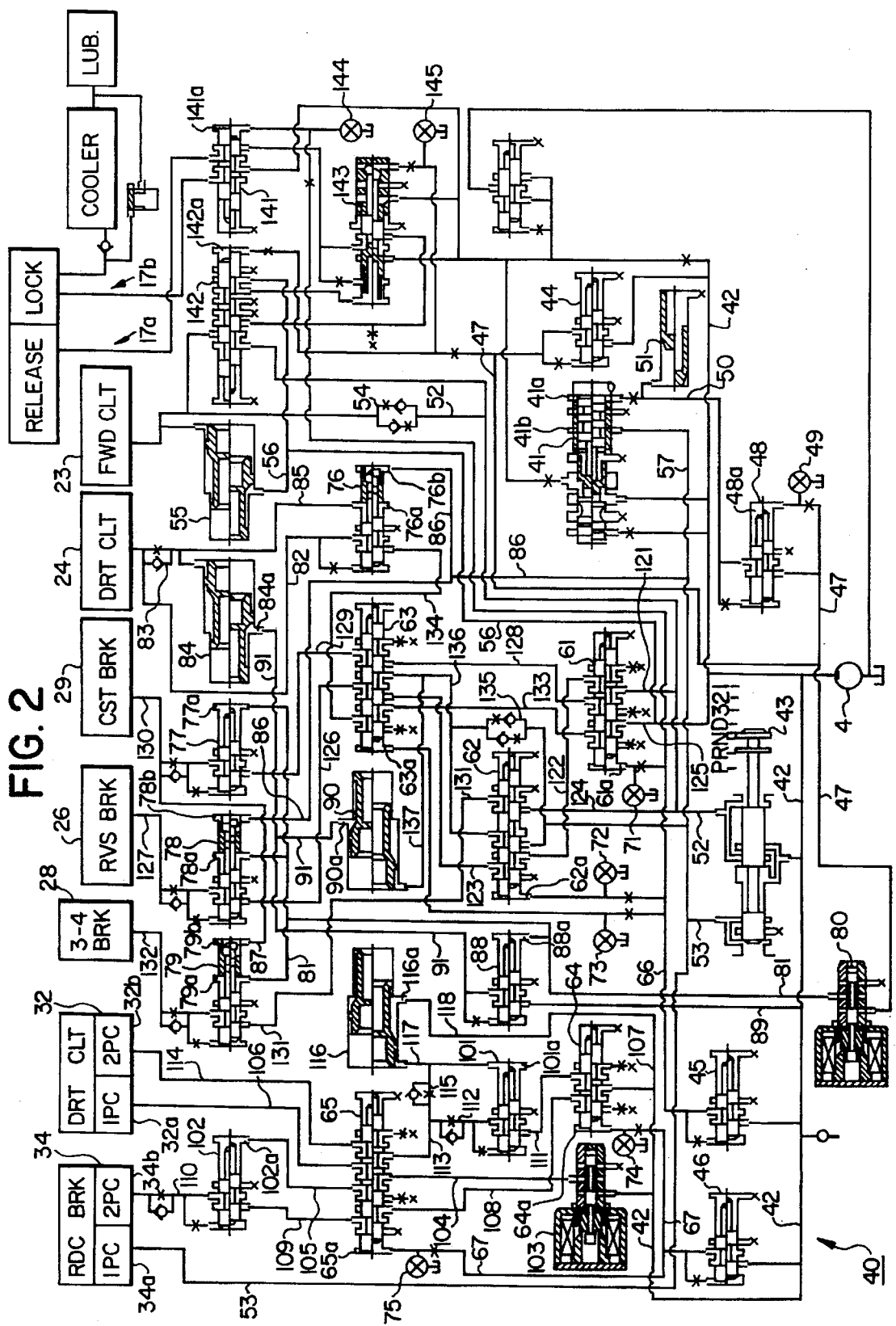
FIG. 2 is a hydraulic control circuit for the gear shift control system.

Referring to FIG. 2, a hydraulic circuit 40, having a regulator valve 41 for regulating a hydraulic pressure discharged from the oil pump 4 to a specified level of line pressure, is configured so as to supply the regulated line pressure to a manually operated range shift valve 43 operated by the driver and first to third reducing valves 44–46 for creating control pressures through a main pressure line 42. A source control pressure of a specified level to which first reducing valve 44 reduces the line pressure is applied to a modulator valve 48 through a pressure line 47. The modulator valve 48 is further supplied with a control pressure at its control port 48a. The level of the control pressure is regulated according to the duty rate of a duty solenoid 49. Thus, the modulator valve 48 modulates the specified level of source control pressure according to the level of control pressure regulated by the duty solenoid 49 so as to create a modulated control pressure. The regulator valve 41 is supplied at its amplification port 41a with this modulated control pressure through a pressure line 50 so as to amplify the line pressure according to the duty rate of duty solenoid 49. In this instance, the duty rate of duty solenoid 49 is established according, for instance, to an engine throttle opening so as to regulate the line pressure according to the engine throttle opening. The pressure line 50, through which the modulated control pressure is supplied to regulator valve 41 at the amplification port 41a, is provided with a first accumulator 51 for alleviating pulsations of pressure caused due to the periodical operation of duty solenoid 49.

Manually operated range shift valve 43 is operated so as to selectively place the automatic transmission 1 into various forward ranges, namely a drive (D) range, a third (3rd) range, a second (2nd) range, a first (1st) range, a reverse (R) range, a neutral (N) range, and a park (P) range. This range shift valve 43 brings the main pressure line 42 into communication with a forward pressure line 52 or with a reverse pressure line 53. This forward pressure line 52 leads to the forward clutch 23 through a bidirectional orifice 54 which has the flow rate of pressure different between the pressure supply direction and the pressure discharge direction. Accordingly, the forward clutch 23 is always kept locked when the range shift valve 43 is in any one of forward ranges, namely the D, 3rd, 2nd and 1st ranges. In this instance, the forward pressure line 52 is provided with a second accumulator 55 for alleviating or preventing shocks due to an abrupt increase in the locking pressure supplied to the forward clutch 23 to which a back pressure is supplied from the main pressure line 42 through a pressure line 56.

Secondary direct coupling clutch 32 installed in secondary transmission gear mechanism 30 has first and second pressure chambers 32a and 32b having different pressure receiving areas. Accordingly, the secondary direct coupling clutch 32 generates a locking pressure when a certain level of line pressure is introduced into the first pressure chamber 32a, which is larger in pressure receiving area than the second pressure chamber 32b, and the same level of line pressure is introduced into the second pressure chamber 32b. Similarly, speed reduction brake 34 installed in secondary transmission gear mechanism 30 has first and second pressure chambers 34a and 34b having different pressure receiving areas. Accordingly, the speed reduction brake 34 generates a locking pressure when a certain level of line pressure is introduced into the first pressure chamber 34a, which is larger in pressure receiving area than the second pressure chamber 34b, and the same level of line pressure is introduced into the second pressure chamber 34b.

Reverse pressure line 53 leads directly to the first pressure chamber 34a of speed reduction brake 34, which is larger in pressure receiving area than the second pressure chamber 34b, so that, in the reverse (R) range, the speed reduction brake 34 is locked with a large locking pressure generated according to the line pressure introduced into the speed reduction brake 34 at its first pressure chamber 34a. In this instance, a pressure line 57, which branches off from the reverse pressure line 53, leads to the regulator valve 41 at its amplification port 41b so as to change the line pressure upward when the reverse (R) range is selected. Through the main, forward and reverse pressure lines 42, 52 and 53, the line pressure is supplied to first to third shift valves 61 to 63 for primary transmission gear mechanism 20 and fourth and fifth shift valves 64 and 65 for secondary transmission gear mechanism 30.

These first to fifth shift valves 61–65 are provided with control ports 61a–65a, respectively. A source pressure line 66, which extends from the second speed reducing valve 45, leads to the first to third shift valves 61–63 at their control ports 61a–63a, respectively. Similarly, a source pressure line 67, which extends from the third speed reducing valve 46, leads to the third and fifth shift valves 64 and 65 at their control ports 64a–64a, respectively. The source pressure line 66 is provided with first to third switching or ON-OFF solenoids 71–73 related to the first to third shift valves 61–63, respectively. Similarly, the source pressure line 67 is provided with fourth and fifth switching or ON-OFF solenoids 74 and 75 related to the fourth and fifth shift valves 64 and 65, respectively. When these switching solenoids 71–75 are switched on, the respective shift valves 61–65 drain at their control ports 61a–65a, respectively, so as to place their spools to the left positions as viewed in FIG. 2, respectively. On the other hand, when these switching solenoids 71–75 are switched off, the respective shift valves 61–65 place their spools to the right positions as viewed in FIG. 2, respectively.

According to operational patterns of the switching solenoids 71–75 or positional patterns of the spools of shift valves 61–65, the pressure lines extending from the main, forward and reverse pressure lines 42, 52 and 53 are selectively brought into communication with the respective clutches and brakes so as to selectively lock and unlock them according to the operational patterns indicated in Table I, thereby selectively placing the automatic transmission 1 into the available forward gears and the reverse gear. In this instance, the locking pressure supplied to each of the clutches and brakes is properly controlled in a manner described as follows.

Relating to the clutches and brakes for primary transmission gear mechanism 20, namely the primary direct coupling clutch 24, coast clutch 29, low reverse brake 26 and 3–4 brake 28, the hydraulic control circuit 40 is provided with control valves 76–79 for reducing the line pressure and regulating it to a certain level of locking pressure. Specifically, the control valves 77–79 are supplied at their control ports 77a–79a, respectively, with a control pressure regulated by a first linear solenoid valve 80 through a pressure line 81 so as to regulate the locking pressure responding to the control pressure. On the other hand, the control valve 76 is supplied at its control port 76a with the locking pressure, which is supplied to the primary direct coupling clutch 24 through a pressure line 82, through a pressure line 85 provided with a one-way orifice 83 and a third accumulator 84 for controlling of the initial rise of locking pressure.

First linear solenoid valve 80 regulates the source control pressure supplied by the first reducing valve 44 via the pressure line 47 responding to a control signal provided from a controller 160 (see FIG. 3) so as to generate a control pressure according to a current gear and driving conditions. A pressure line 86 branches off from the reverse pressure line 53 and is in communication with clutch control valve 76 and low reverse control valve 78 at their ports 76b and 78b, respectively. Through this pressure line 86, the clutch control valve 76 and low reverse control valve 78 are supplied with the line pressure in the reverse (R) range and their spools are placed in the left positions, as viewed in FIG. 2, so as to prohibit the regulation of locking pressure of control valves 76 and 78. When the coast brake 29 is supplied with a locking pressure, the 3–4 brake control valve 79 is supplied at its port 76b with the locking pressure through a pressure line 87 so as to be restricted in pressure regulative operation. The control pressure generated by the first linear solenoid valve 80 is also supplied to an accumulator control valve 88 via its control port 88a. This accumulator control valve 88 regulates the line pressure introduced through the main pressure line 42 via a pressure line according to the control pressure generated by the first linear solenoid valve 80 and supplies it as a back pressure to the third and fourth accumulators 84 and 90 via their back pressure ports 84a and 90a, respectively.

For controlling a locking pressure for secondary transmission gear mechanism 30, there are provided, in the hydraulic control circuit 40, control valves 101 and 102. The control valve 101 controls a locking pressure introduced into the secondary direct coupling clutch 32 at the first pressure chamber 32a which is larger in pressure receiving area than the second pressure chamber 32b or at the second pressure chamber 32b. The control valve 102 controls a locking pressure introduced into the speed reduction brake 34 at the second pressure chamber 34b which is smaller in pressure receiving area than the first pressure chamber 34a. In this instance, the speed reducing brake 34 is supplied directly at the first pressure chamber 34a which is larger in pressure receiving area than the second pressure chamber 34b with the line pressure from the range shift valve 43 through the reverse pressure line 53 in the reverse (R) range.

Second linear solenoid valve 103 is supplied with the line pressure as a source control pressure through the main pressure line 42 and regulates the line pressure according to a control signal provided by the controller 160. After this line pressure has been regulated, it further regulates the pressure supplied from the pressure line 105 via the fifth shift valve 65 to a control port 102a of speed reducing brake control valve 102a through the pressure line 104 or to the first pressure chamber 32a of secondary direct coupling clutch 32 through the pressure line 106. While the speed reducing brake control valve 102 is supplied at its control port 102a with the control pressure generated by the speed reducing brake control valve 103, it regulates the line pressure supplied thereto through the main pressure line 42, a pressure line 107, the fourth shift valve 64, a pressure line 108, the fifth shift valve 65 and a pressure line 109, in this order, according to the control pressure and then supplies it into the speed reduction brake 34 at the second pressure chamber 34b through a pressure line 110.

Secondary direct coupling clutch control valve 101 is supplied with the line pressure through the main pressure line 42, a pressure line 107, the fourth shift valve 64 and a pressure line 111, in this order, and, after having regulated it, supplies the regulated pressure into the secondary direct coupling clutch 32 at the first pressure chamber 32a through the pressure line 106 via a pressure line 113 with a one-way orifice 112 and the fifth shift valve 65 or at the second pressure chamber 32b through the pressure line 114 via the pressure line 113 and the fifth shift valve 65. The direct coupling clutch control valve 101 is supplied at its control port 101a with the locking pressure, which the secondary direct coupling pressure 32 receives at its first pressure chamber 32a or at its second pressure chamber 32b, as a control pressure through a pressure line 117 with a one-way orifice 115 and a fifth accumulator 116. With this configuration, the locking pressure rises after having been held at a certain transitional level of pressure by the aid of the fifth accumulator 116. In this instance, the fifth accumulator 116 is provided with a back pressure port 116a at which it is supplied with a back pressure through the main pressure line via a pressure line 118.

In the configuration of hydraulic control circuit 40, operational patterns of the first to fifth switching solenoids 71–75, according to which the automatic transmission 1 is selectively placed into the available forward and reverse gears, are indicated in Table II. Indicated by (1) and (2) are the first gear and the second gear in an engine brake available range.

TABLE II

| Solenoid Gear & | Primary Gear Mechanism | | | Secondary Gear Mechanism | |
|---|---|---|---|---|---|
| Range | 1st | 2nd | 3rd | 4th | 5th |
| P | OFF | OFF | OFF | OFF | OFF |
| R | OFF | OFF | OFF | OFF | OFF |

TABLE II-continued

| Solenoid Gear & | Primary Gear Mechanism | | | Secondary Gear Mechanism | |
|---|---|---|---|---|---|
| Range | 1st | 2nd | 3rd | 4th | 5th |
| N | OFF | OFF | OFF | OFF | OFF |
| 1 | ON | OFF | OFF | OFF | OFF |
| D (1) | ON | OFF | ON | OFF | OFF |
| 3 2 | ON | OFF | OFF | ON | OFF |
| 2 (2) | ON | OFF | ON | ON | OFF |
| 1 3 | OFF | ON | ON | OFF | OFF |
| 4 | OFF | ON | ON | ON | ON |
| 5 | OFF | ON | OFF | ON | ON |

First to third switching solenoids 71–73 for primary transmission gear mechanism 20 are operated in combination as indicated in Table II. Specifically, for the first speed, which renders engine braking unavailable, selected in the drive range (D), only the first switching solenoid 71 is turned ON and all other solenoids 72 and 73 are turned OFF, so that the first shift valve 61 places its spool in the left position and the second and third shift valves 62 and 63 place their spools in the right positions. In this operational pattern of the first to third switching solenoids 71–73, the first shift valve 61 brings a pressure line 121 branching off from the forward pressure line 52 into communication with a pressure line 122. Although the second shift valve 62 further brings the pressure line 122 into communication with a pressure line 123, the third shift valve 63 blocks it. At the same time, the first and second shift valves 61 and 62 block other pressure lines 125 and 124, respectively, each of which branches off from the main pressure line 42. Accordingly, as was previously described, when the first gear is selected in the drive range (D), only the forward clutch 23, which is always locked in the forward ranges, i.e. a drive range (D), a third range (3), a second range (2) and a first range (1), is held locked, so that the primary transmission gear mechanism 20 is placed into the low speed forward gear and renders engine braking unavailable. Concurrently, in the secondary transmission gear mechanism 30, both fourth and fifth switching solenoids 74 and 75 are held turned OFF, so that the fourth and fifth shift valves 64 and 65 place their spools in the right positions. As a result, the fourth shift valve 64 brings the pressure line 107 branching off from the main pressure line 42 into communication with the pressure line 108, and the fifth shift valve 65 brings the pressure line 108 into communication with the pressure line 109 leading to the speed reduction brake control valve 102, so as to supply the line pressure to the speed reduction brake control valve 102. At this time, the speed reduction brake control valve 102 is supplied at its control port 102a with the control pressure generated by the second linear solenoid valve 103 through the pressure line 105 via the fifth shift valve 65. The line pressure is regulated as a certain locking pressure corresponding to the control pressure and supplied to the speed reduction brake 34 at the second pressure chamber 34b. Accordingly, the speed reduction brake 34 is locked.

On the other hand, the fifth shift valve 65 brings the first pressure chamber 32a of the secondary direct coupling clutch 32 into communication with a drain port of the fourth shift valve 64 through pressure lines 106, 113 and 111 communicated by the fifth shift valve 65 and the direct coupling clutch control valve 101 and, simultaneously, brings the second pressure chamber 32b of secondary direct coupling clutch 32 into communication with a drain port of the fifth shift valve 65 through a pressure line 114, so as to hold the secondary direct coupling clutch 32 unlocked. As a result, the secondary transmission gear mechanism 30 is placed into a low speed forward gear and renders engine braking available. Accordingly, the automatic transmission 1 is placed, as a whole, into the first speed gear rendering engine braking unavailable.

For the engine brake available first speed gear selected in the first range and in the second range, concurrently with turning ON of the third solenoid 73 in the primary transmission gear mechanism 20 from the OFF state, the third shift valve 63 places its spool in the left positions. Accordingly, in this state, the third shift valve 63 brings the pressure line 126, leading to the low reverse brake control valve 78, into communication with a pressure line 126 in communication with a pressure line 123 by means of the second shift valve 62 which has been communicated with a pressure line 122 in communication with the pressure line 121 branching off from the forward pressure line 52 via the first shift valve 61. As a result, the low reverse brake control valve 78 is supplied with the line pressure. Then, after having regulated it as a locking pressure corresponding to the control pressure supplied thereto at its control port 78a through the pressure line 81 from the first linear solenoid valve 80, the valve 78 supplies the locking pressure to the low reverse brake 29 through a pressure line 127. As a result, in addition to locking of the forward clutch 23, the low reverse brake 29 is locked, so that the primary transmission gear mechanism 20 is placed into the engine brake available low speed gear. On the other hand, since the speed reduction brake 34 in the secondary transmission gear mechanism 30 is held locked in the same manner as for the engine brake unavailable first speed gear, the automatic transmission 1 is placed as a whole into the engine brake available first speed gear.

For the engine brake unavailable second speed gear selected in the drive range and for the engine brake available second speed gear selected in the first range and in the second range, only the secondary transmission gear mechanism 30 is changed while the primary transmission gear mechanism 20 is held in the same state as for the engine brake unavailable first speed gear and for the engine brake available first speed gear, respectively. Specifically, when the fourth shift valve 64 places its spool in left position following turning ON of the fourth switching solenoid 74 for the secondary transmission gear mechanism 30, the direct coupling clutch control valve 101 is supplied with the line pressure through the pressure line 111 having been brought into communication with the pressure line 107 branching off from the main pressure line 42 by the fourth shift valve 64. After rising of the line pressure is adjusted, the line pressure is supplied to the secondary direct coupling clutch 32 at its first pressure chamber 32a through the pressure line 106 which has been brought into communication with the pressure line 113 by the fifth shift valve 65. Consequently, the secondary transmission gear mechanism 30 is placed into the high speed gear, so that the automatic transmission 1 is placed into the engine brake unavailable second speed gear or into the engine brake available second speed gear.

For the third speed gear, following turning OFF, ON and ON of the first to third switching solenoids 71–73 for primary transmission gear mechanism 20, respectively, the first to third shift valves 61 to 63 place their spools to the right, left and left positions, respectively. Consequently, the first shift valve 61 brings a pressure line 128 into communication with one pressure line 121 branching off from the forward pressure line 52, and the third shift valve 63 brings the pressure line 128 into communication with a pressure line 129 leading to the coast brake control valve 77, so that the coast brake control valve 77 is supplied with the line pressure and, after having regulated it as a locking pressure to a certain level of pressure according to the control pressure provided from the first linear solenoid valve 80 through the pressure line 81, supplies the locking pressure to the coast brake 29 through a pressure line 130 so as to lock the coast brake 29. Concurrently, the second shift valve 62 brings a pressure line 131 leading to the 3–4 brake control valve 79 into communication with another pressure line 124 branching off from the forward pressure line 52, so that the 3–4 brake control valve 79 is supplied with the line pressure. This 3–4 brake control valve 79 is also supplied with the control pressure from the first linear solenoid valve 80 through the pressure line 81 and further supplied with a control pressure, which is the locking pressure supplied to the coast brake 29, through the pressure line 87. According to these control pressures, the 3–4 brake control valve 79 regulates the line pressure as a locking pressure and supplies it to the 3–4 brake 28 through a pressure line 132. As a result, the primary transmission gear mechanism 20 is placed into the engine brake available middle speed gear by means of the locking of 3–4 brake 28 and coast brake 29 as well as the locking of the forward clutch 23.

On the other hand, when both fourth and fifth switching solenoids 74 and 75 for secondary transmission gear mechanism 30 are turned OFF, the secondary transmission gear mechanism 30 is placed into an engine brake available low speed gear in the same manner as for the first speed gear. Accordingly, the automatic transmission 1 is placed as one whole into the engine brake available third speed gear.

For the fourth speed gear, both fourth and fifth switching solenoids 74 and 75 for secondary transmission gear mechanism 30 are turned ON from the state in the third speed gear in which they are turned OFF, so that the fourth and fifth shift valves 74 and 75 place their spools in the left positions. As a result, in the same manner as for the second speed gear, the fourth shift valve 64 brings the pressure line 111 in communication with the pressure line 107 branching off from the main pressure line 42, so as to supply the line pressure to the direct coupling clutch control valve 101. After regulating the rising of the line pressure, the valve 64 supplies the regulated pressure as a locking pressure to the secondary direct coupling clutch 32 at the second pressure chamber 32b through the pressure line 114 which has been brought into communication with the pressure line 113 by the fifth shift valve 65. Consequently, the secondary direct clutch 32 is locked to place the secondary transmission gear mechanism 30 into the high speed gear. At this time, since the primary transmission gear mechanism 20 has been placed into the middle speed gear in the same manner as for the third speed gear, the automatic transmission 1 is placed as one whole into the fourth speed gear.

For the fifth speed gear, the first to third switching solenoids 71–73 for primary transmission gear mechanism 20 are turned OFF, ON and OFF, respectively, while the fourth and fifth switching solenoids 74 and 75 are held turned ON. As a result, the first to third shift valves 61–63 place their spools in the right, left and right positions, respectively, so that the first shift valve 61 brings a pressure line 133 in communication with the pressure line 125 branching off from the main pressure line 42. Concurrently, the third shift valve 63 brings the pressure line 133 in communication with a pressure line 134 leading to the direct clutch control valve 76 to supply the line pressure to the direct clutch control valve 76. Thus, after the direct clutch control valve 76 has regulated the line pressure as a locking pressure, it supplies the locking pressure to the primary direct coupling clutch 24 through the pressure line 82. Accordingly, by means of the locking of forward clutch 23 and direct coupling clutch 24, the primary transmission gear mechanism 20 is placed into the high speed gear. Before the locking of primary direct coupling clutch 24, the third accumulator 84 holds the locking pressure at a certain transitional level of pressure for a while and, thereafter, allows it to rise.

For the reverse gear selected in the drive range (D), while the range shift valve 43 has brought the reverse pressure line 53 into communication with the main pressure line 42, all of the first to third solenoids 71–73 are turned OFF, so that the first to third shift valves 61–63 place their spools in the right positions. Accordingly, in the same manner as for the fifth speed gear, the first shift valve 61 brings the pressure line 133 into communication with the pressure line 125 branching off from the main pressure line 42, and concurrently, the third shift valve 63 brings the pressure line 133 into communication with the pressure line 134 leading to the direct clutch control valve 76, so that the direct clutch control valve 76 is supplied with the line pressure. In this instance, since the direct clutch control valve 76 is also supplied at its port 76b with the line pressure from the reverse pressure line 53 through the pressure line 86, it holds its spool in the left position. As a result, the line pressure supplied through the pressure line 134 is introduced into the direct coupling clutch 24 through the pressure line 82, without being reduced, so as to lock the direct coupling clutch 24. Further, the third shift valve 63 brings a pressure line 136 with a bidirectional orifice 135, having different flow rates between the pressure supply direction and the pressure discharge direction, into in communication with the pressure line 126 so as to supply the line pressure to the low reverse brake control valve 78 from the reverse pressure line 53. At this time, the low reverse brake control valve 78 is also supplied at its port 78b with the line pressure through the pressure line 86 branching off from the reverse pressure line 53, so as to hold its spool in the left position. As a result, the line pressure introduced through the pressure line 126 is supplied to the low reverse brake without being regulated and locks it.

That is, on one hand, the primary transmission gear mechanism 20 is placed into the reverse gear resulting from the locking of the direct coupling clutch 24 and the low reverse brake 26 and, on the other hand, the transmission gear mechanism 30 is placed into the engine brake available low speed gear resulting from the turn OFF of the fourth and fifth switching solenoids 74 and 75. Accordingly, the automatic transmission 1 is placed into the reverse gear with a high speed reduction rate. In this instance, during the supply of locking pressure into the low reverse brake 26, a pressure is introduced into the fourth accumulator 90 through pressure lines 136 and 137, so that the locking pressure rises after having been held at a certain transitional level of pressure.

Hydraulic control circuit 40 is further configured so as to lock up and unlock the lock-up clutch 17 and allow it to slip in a well known manner. For these lock-up clutch controls, the hydraulic control circuit 40 is provided with various other valves and solenoids, such as first and second lock-up control shift valves 141 and 142, a lock-up control valve 143, a lock-up control switching solenoid 144 and a lock-up control duty solenoid 145.

Figure 3:
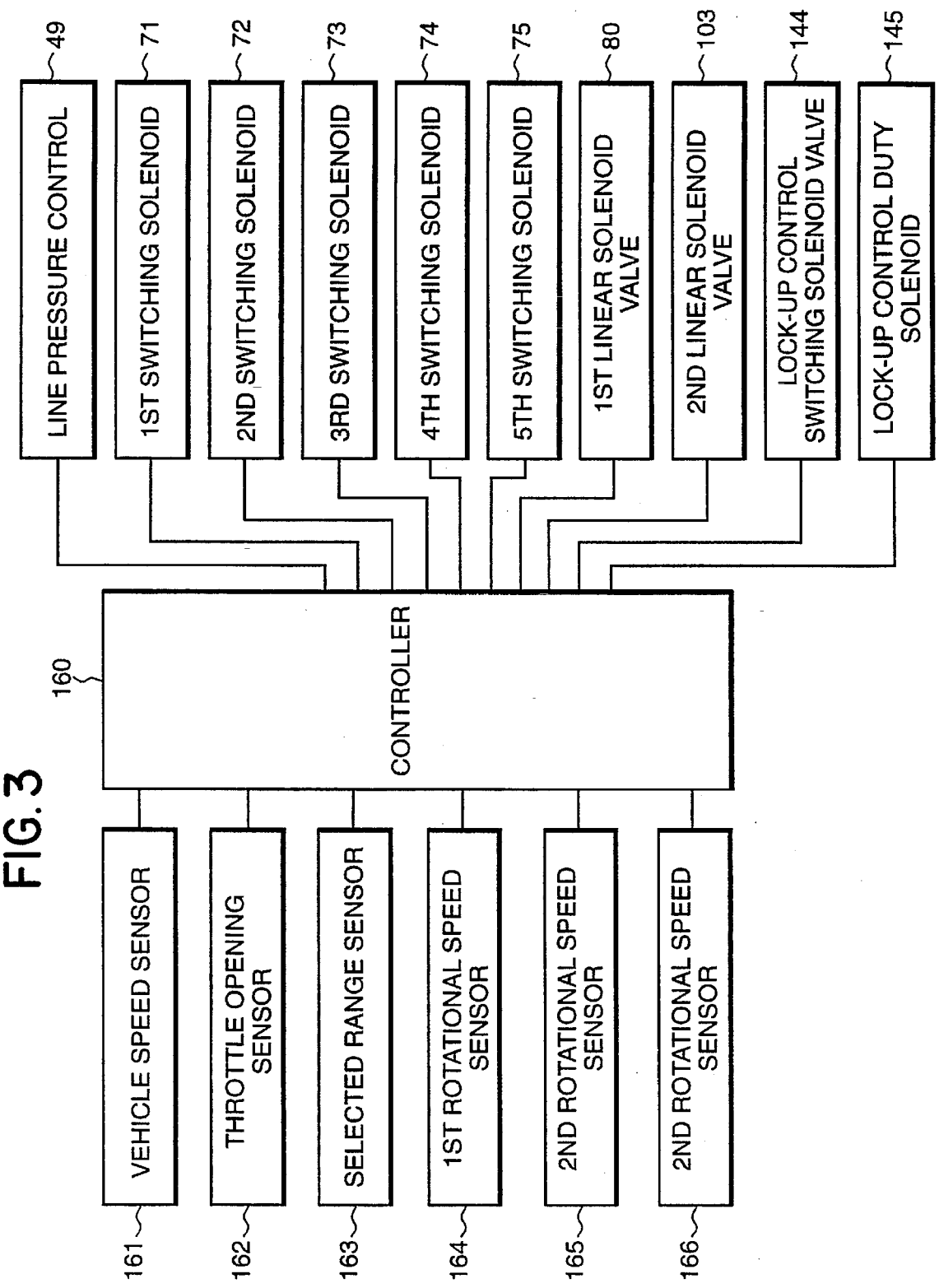
FIG. 3 is a block diagram showing a solenoid valve control system of the gear shift control system.

Referring to FIG. 3, the controller 160 provides various control signals which operate and control various valves, such as the duty solenoid 49 for line pressure regulation, the first to fifth switching solenoids 71–75 for gear shift control, the first and second linear solenoid valves 80 and 103 for locking pressure regulation, the lock-up control switching solenoid 144 and the lock-up control duty solenoid 145. These control signals are provided based on various control factors representative of driving conditions and driver's demands, such as a vehicle speed detected by a speed sensor 161, an engine throttle opening detected by a throttle opening sensor 162, a selected range detected by a shift range sensor 163, and transmission rotational speeds, such as a transmission input speed equivalent to a speed of the turbine 13 of torque convertor 10, a transmission interim speed represented by the rotational speed of primary and secondary interim gears 5 and 6 and a transmission output speed which are detected by first and third rotational speed sensors 164–266, respectively.

Gear shift control will be hereafter described in detail with respect to a first to second (1–2) gear shift by way of example.

When shifting the automatic transmission from the first speed gear to the third speed gear, the secondary direct coupling clutch 32 is locked concurrently with unlocking of the speed reduction brake 34 so as to shift up the secondary transmission gear mechanism 30 from the low speed gear to the high speed gear. During this shifting up of secondary transmission gear mechanism 30, the locking pressure to be introduced into the secondary direct coupling clutch 34 rises after having been held at a certain transitional level of pressure so as to alleviate shift shocks. Accordingly, although the switching solenoids 71–75 change in operational pattern for the second speed gear as indicated in Table II, they actually take a transitional operational pattern during the first to second gear shift as indicated in Table III.

TABLE III

| Solenoid | Operational Pattern | | | | |
| --- | --- | --- | --- | --- | --- |
| | Primary Gear Mechanism | | Secondary Gear Mechanism | | |
| Gear | 1st | 2nd | 3rd | 4th | 5th |
| 1st | ON | OFF | OFF | OFF | OFF |
| Transitional | ON | OFF | OFF | OFF | ON |
| 2nd | ON | OFF | OFF | ON | OFF |

Figure 4:
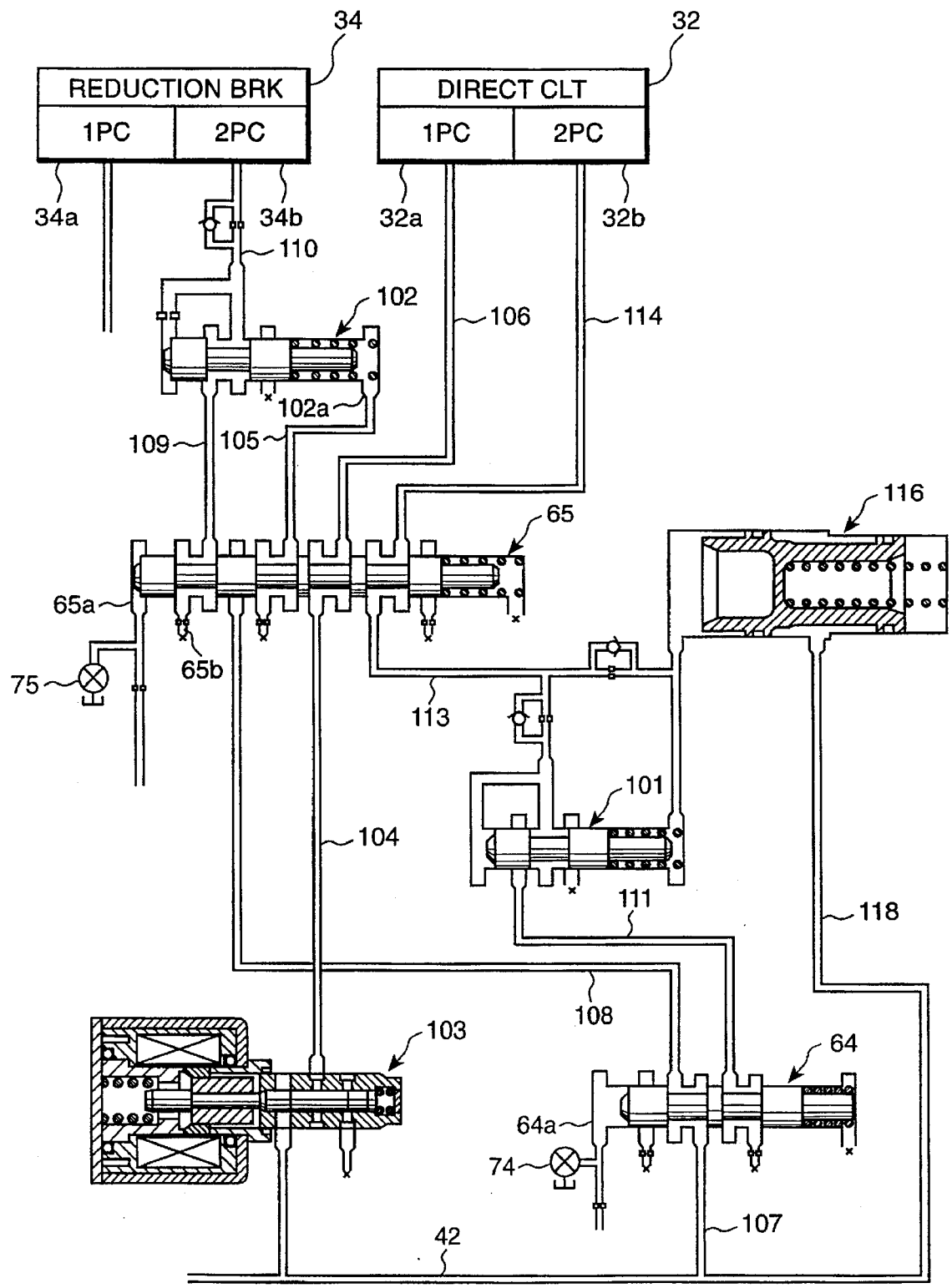
FIG. 4 is an enlarged illustration of part of the hydraulic control circuit for a secondary transmission gear mechanism.

Referring to FIG. 4, during the first to second gear shift, the fifth switching solenoid 75 held turned OFF for the first speed gear, is transitionally turned ON and then turned OFF for the second speed gear. This turning ON of fifth switching solenoid 75 causes the fifth shift valve 65 to shift its spool to the left position, so as, on one hand, to bring the second pressure chamber 34b of speed reduction brake 34 in communication with the drain port 65b of fifth shift valve 65 through the pressure lines 109 and 110, and on the other hand, to bring the first pressure chamber 32a of secondary direct coupling clutch 32 in communication with the second linear solenoid valve 103 through the pressure lines 104 and 106. As a result, the second linear solenoid valve 103 is enabled to control a locking pressure to be introduced into the first pressure chamber 32a of secondary direct coupling clutch 32. When the first to second gear shift is completed, the fourth switching solenoid 74 is turned OFF, and concurrently, the fifth switching solenoid 75 is turned ON. This causes the fourth shift valve 64 to shift its spool to the left position and the fifth shift valve 65 to shift its spool to the right position. As a result, the fourth shift valve 64 brings the pressure line 106 leading to the first pressure chamber 32a of secondary direct coupling clutch 32 in communication with the pressure line 113 into which the line pressure is introduced through the main pressure line via the fourth shift valve 64 and the secondary direct coupling clutch control valve 101, so as to supply the line pressure as a locking pressure to the secondary direct coupling clutch 32. During the first to second gear shift, the second linear solenoid valve 103 performs pressure control as follows.

Figure 5A:
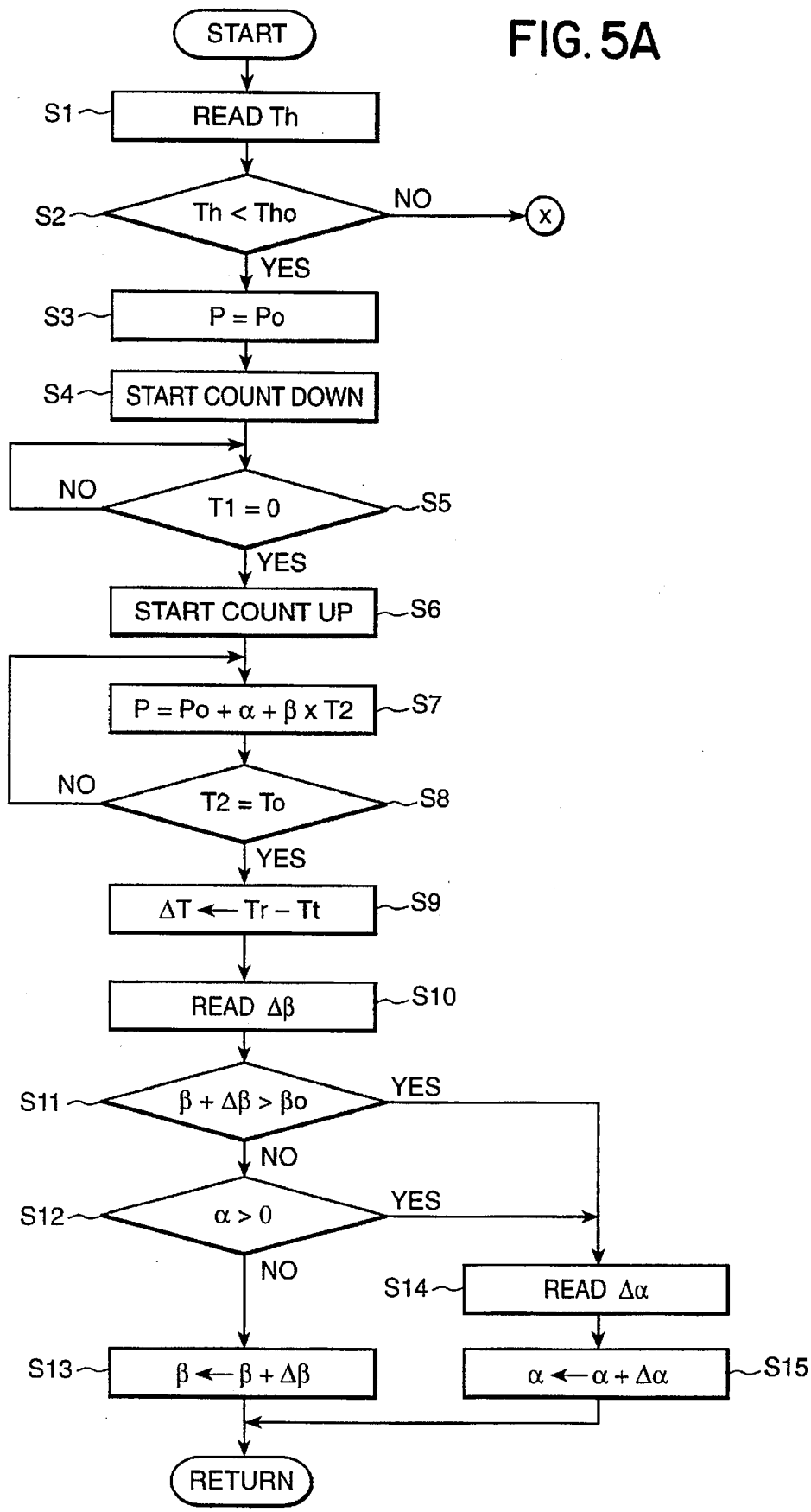
FIGS. 5A and 5B are flow charts illustrating a pressure control sequential routine.
Figure 5B:
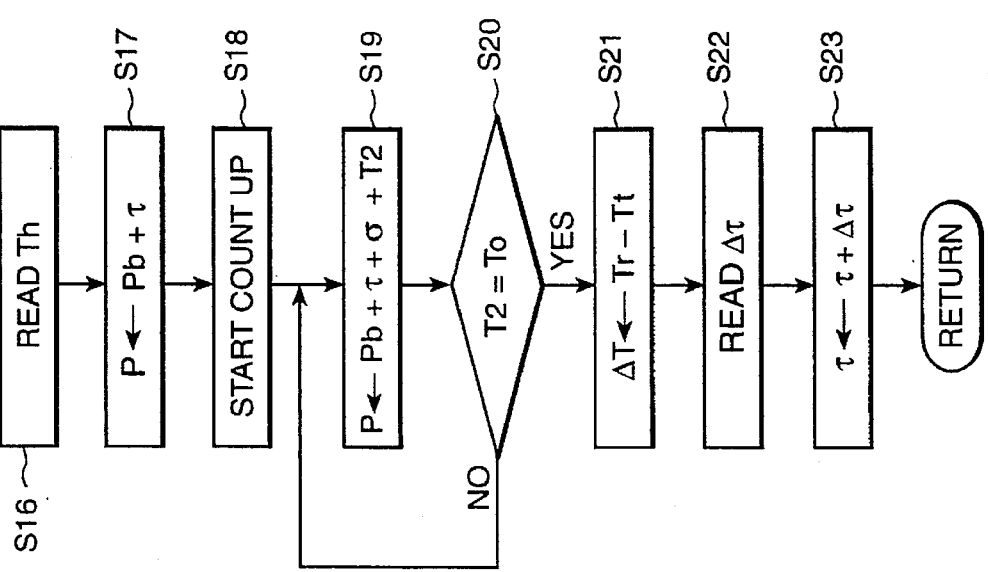

Referring to FIGS. 5A and 5B, which are flow charts illustrating the pressure control sequential routine of second linear solenoid valve 103, the sequence commences or is reset and control passes directly to a function block S1 in which a throttle opening signal from the throttle opening sensor 162 is read to detect a current engine throttle opening Th. Subsequently, the control proceeds to step S2 to make a decision as to whether the current engine throttle opening Th is smaller than a critical engine throttle opening Tho for judgement. If the answer to the decision is "YES," then, a locking pressure P is set to an initial locking pressure Po specified for smaller engine throttle openings Th at step S3. Controller 160 provides a control signal to the second linear solenoid valve 103 according to a predetermined control curve so as to develop the locking pressure P. Subsequent to activating a first timer to count down a time T1 at step S4, a decision is made at step S5 as to whether the time T1 has been fully counted down. This decision is continued until the time T1 is fully counted down. As soon as the completion of counting down of the time T1, a second timer is activated to count-up a time T2 at step S6. Then, at step S7, a setting of locking pressure P takes place. This locking pressure is expressed by the following equation:

$$P = Po + \alpha + \beta \times T2$$

where $\alpha$ is a learning value of the transitional level of pressure; and $\beta$ is the gradient coefficient of the transitional level of pressure.

Figure 6:
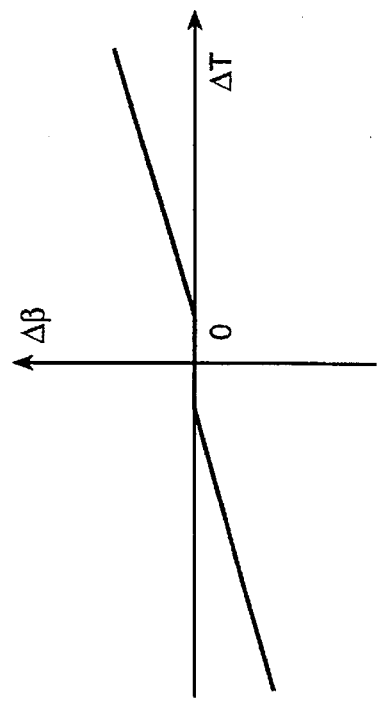
FIG. 6 is a gradient coefficient corrective value map for small engine throttle openings.

Subsequently, a decision is made at step S8 as to whether the counted time T2 has reached a critical time To. This critical time To is established such that it is a little longer than an expected time necessary for the automatic transmission 1 to complete a gear shift. Accordingly, a gear shift has been completed before the time T2 counted by the first timer reaches the critical time To. This decision made at step S8 is repeated until the timer counts up the critical time T2. When the answer to the decision is "YES," then, at step S9, a calculation is made to detect a shifting time difference $\Delta T$ of an actual shifting time Tr from a target shifting time Tt. On the basis of this shifting time difference $\Delta T$, a corrective value $\Delta \beta$, with which the gradient coefficient $\beta$ of the transitional level of pressure is corrected, is subsequently read out from a gradient coefficient corrective value map shown in FIG. 6 at step 10. As shown in FIG. 6, the gradient coefficient corrective value map is established such that there is provided a blind range for shifting time differences $\Delta T$ close to zero, and the corrective value $\beta$ ascendingly changes linearly upward from zero with an increase in shifting time difference $\Delta T$ or descendingly changes linearly downward from zero with a decrease in shifting time difference $\Delta T$. For this reason, if an actual shifting time Tr is shorter than the target shifting time Tt, a minus corrective value $\Delta \beta$ is read out corresponding to the shifting time difference T.

Subsequently, the control proceeds to step S11 wherein a decision is made as to whether the current gradient coefficient of the transitional level of pressure with an addition of the corrective value $\Delta \beta$ is larger than a specified maximum gradient coefficient $\beta o$. This decision is made in order to judge that a learning control of the gradient coefficient $\beta$ of the transitional level of pressure provides a gradient coefficient $\beta$ larger than the specified maximum gradient coefficient $\beta o$. If the answer to the decision made at step S11 is "NO," then, a decision is made at step S12 as to whether a currently learned transitional pressure level $\alpha$ is positive. If the answer to the decision is "NO," then, the gradient coefficient $\beta$ of the transitional pressure level is replaced with the current gradient coefficient $\beta$ added by the corrective value $\Delta \beta$ at step S13.

Figure 7:
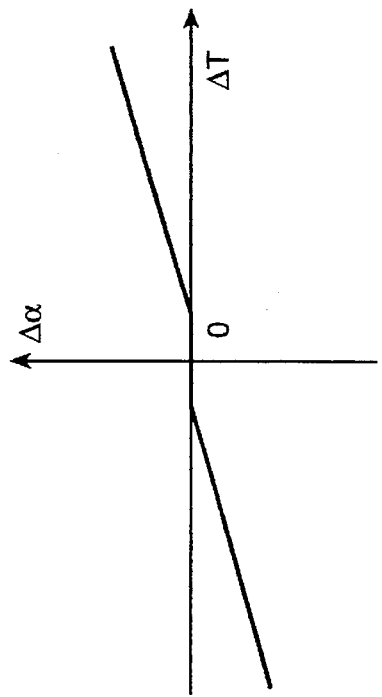
FIG. 7 is a transitional pressure level corrective value map for small engine throttle openings.

If the answer to the decision made at step S11 or step S12 is "YES," then, a corrective value $\Delta \alpha$, with which the transitional level of pressure is corrected, is read out from a transitional pressure level corrective value map shown in FIG. 7 on the basis of this shifting time difference T at step 14. As shown in FIG. 7, the transitional pressure level corrective value map is established such that there is provided a blind range for shifting time differences T close to zero, and the corrective value $\Delta \alpha$ ascendingly changes linearly upward from zero with an increase in shifting time difference $\Delta T$ or descendingly changes linearly downward from zero with a decrease in shifting time difference $\Delta T$. Accordingly, if an actual shifting time Tr is shorter than the target shifting time Tt, a minus corrective value $\Delta \alpha$ is read out corresponding to the shifting time difference $\Delta T$. Subsequently, a transitional pressure level $\alpha$ is replaced with the current transitional pressure level $\alpha$ added by the corrective value $\Delta \alpha$ at step S15.

Figure 8:
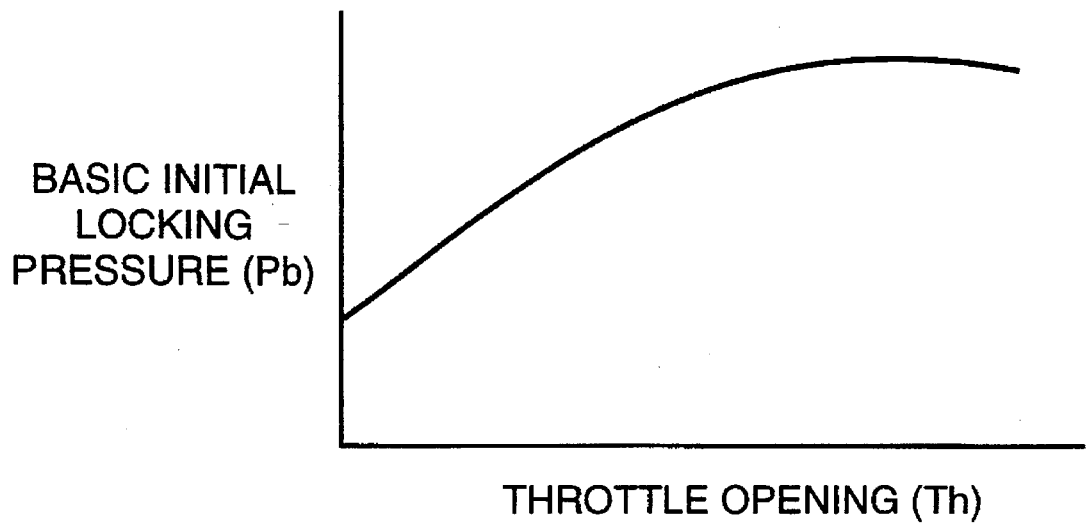
FIG. 8 is a basic initial locking pressure map for large engine throttle openings.

On the other hand, when the answer to the decision made at step S2 is "NO," this indicates that the current engine throttle opening Th is equal to or larger than the critical engine throttle opening Tho. Then, a basic initial locking pressure Pb is read out from a basic initial locking pressure map, shown in FIG. 8, according to the current engine throttle opening Th, at step S16. This map is established such that the basic initial locking pressure Pb increases with an increase in engine throttle opening Th. The control proceeds to step S17 wherein a locking pressure P is replaced with the basic initial locking pressure Pb added by a learning value $\tau$ of the transitional level of pressure at step S17.

Subsequently, after starting the second timer to count up at step S18, a replacement of locking pressure P takes place at step S19. This locking pressure is expressed by the following equation:

$$P = Pb + \tau + \sigma + T2$$

where $\tau$ is a learning value of the transitional level of pressure; and $\sigma$ is the gradient coefficient of the transitional level of pressure.

Figure 9:
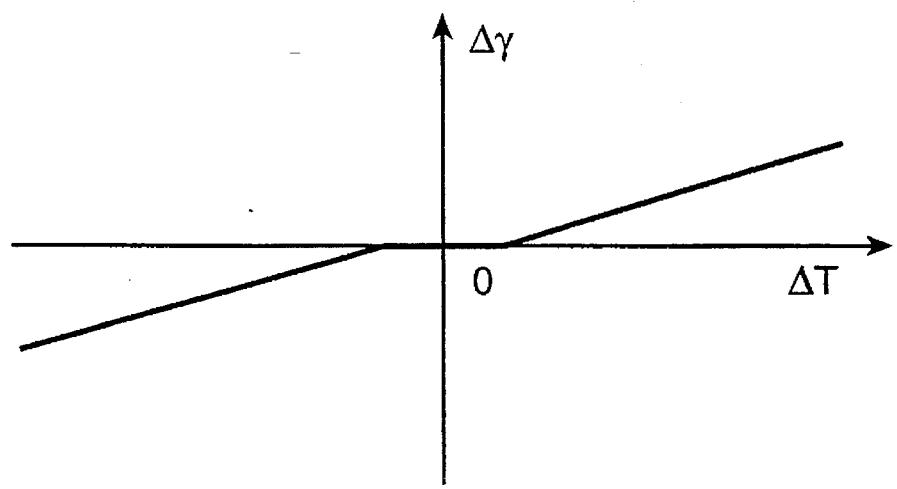
FIG. 9 is a transitional pressure level corrective value map for large engine throttle openings.

Then, a decision is made at step S20 as to whether the counted time T2 has reached the critical time To. This decision is repeated until the timer counts up the critical time T2. When the answer to the decision is "YES," then, at step S21, a calculation is made to detect a shifting time difference $\Delta T$ of an actual shifting time Tr from a target shifting time Tt. On the basis of this shifting time difference $\Delta T$, a corrective value $\Delta \tau$, with which the transitional level of pressure $\tau$ is corrected, is read out from a transitional pressure level corrective value map shown in FIG. 9 on the basis of this shifting time difference $\Delta T$ at step 22. As shown in FIG. 9, the transitional pressure level corrective value map is established such that there is provided a blind range for shifting time differences ΔT close to zero, and the corrective value Δτ ascends linearly upward from zero with an increase in shifting time difference ΔT or descends linearly downward from zero with a decrease in shifting time difference ΔT. Accordingly, if an actual shifting time Tr is shorter than the target shifting time Tt, a minus corrective value Δτ is read out corresponding to the shifting time difference ΔT. Subsequently, a transitional pressure level τ is replaced with the current transitional pressure level τ added by the corrective value Δτ at step S23.

Figure 10:
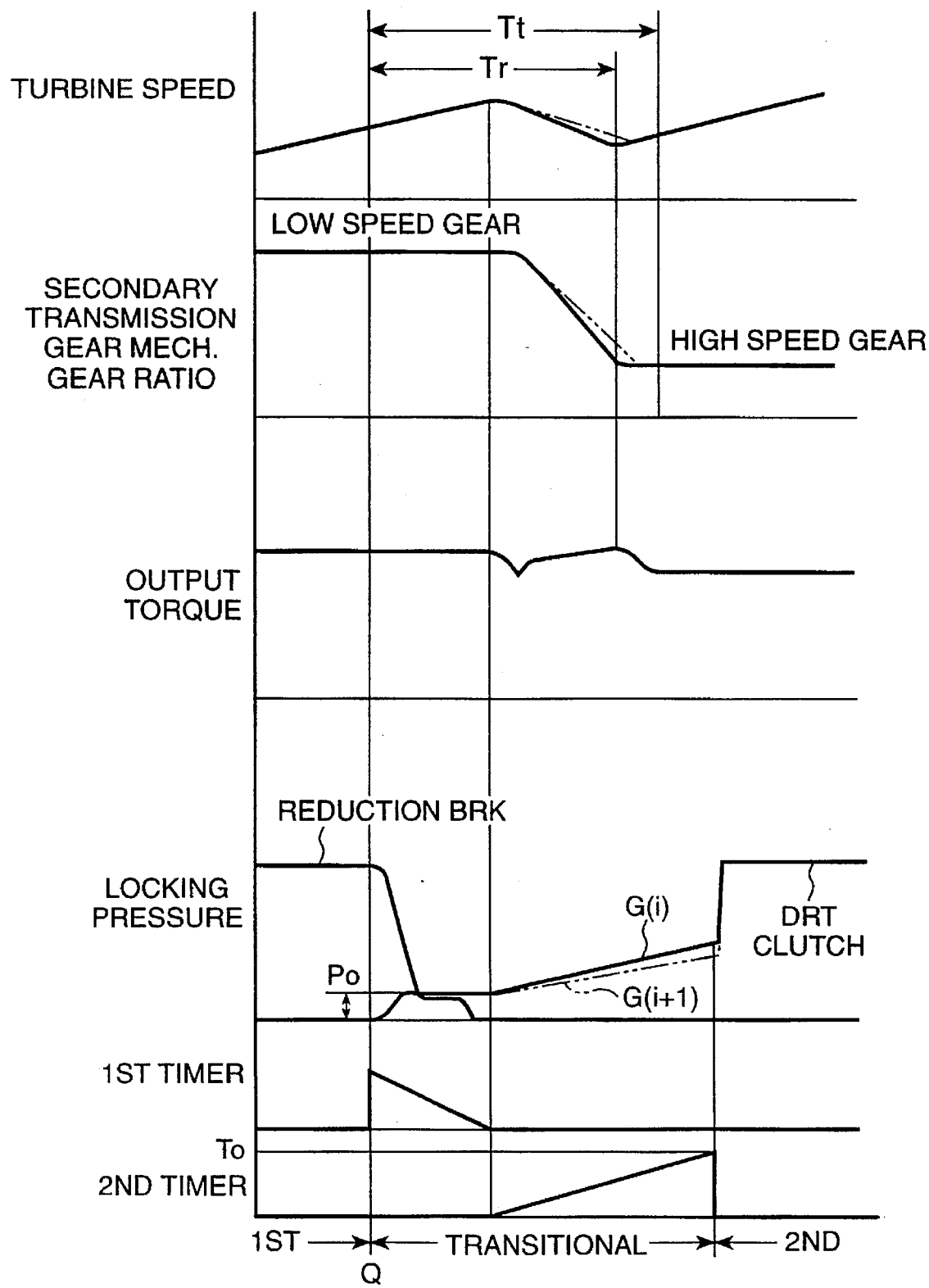
FIGS. 10 and 11 are time charts illustrating a pressure control for small engine throttle openings.

Referring to FIG. 10, when there is the demand for a first to second gear shift in the automatic transmission 1 while an engine throttle opening Th is smaller than the critical engine throttle opening Tho, the first to fifth solenoids 71–75 change from the 1st operational pattern to the transitional operational pattern as indicated in Table III at the time of the appearance of a 1–2 shift command signal Q. Then, the second linear solenoid valve 103 regulates a locking pressure P to be introduced into the secondary direct coupling clutch 32 at its first pressure chamber 32a to the initial locking pressure Po and holds it unchanged until the first timer fully counts down the time T1. After the count down of the time T1 to zero, the second timer starts to count time. In this instance, if the learning value of the transitional pressure level α is zero, the locking pressure P to be introduced into the secondary direct coupling clutch 32 at its first pressure chamber 32a gradually increases at a gradient corresponding to the gradient coefficient of transitional pressure level β from the initial locking pressure Po as indicated by a mark G(i). During this gradual increase in the locking pressure P, locking of the secondary direct coupling clutch 32 progresses and is accompanied by a decrease in turbine speed and a shift of the gear ratio of secondary transmission gear mechanism 30 toward the high speed gear from the low speed gear.

An actual shifting time Tr is defined in this instance as a time from the appearance of shift command signal Q to when the secondary transmission gear mechanism 30 reaches the high gear ratio so as to provide the high speed gear concurrently with a turn of rotational speed of the turbine 13 from a descending change to an ascending change. If the time Tr is shorter than the target shifting time Tt, then the gradient coefficient of transitional pressure level becomes larger as compared with the existing level. As a result, during another 1–2 gear shift, the locking pressure for the secondary direct coupling clutch 32 gradually increases at a smaller gradient as indicated by a mark G(i+1) than the gradient during the current 1–2 gear shift, and simultaneously, the ratio of speed reduction of turbine 13 and the ratio of a gear ratio change of secondary transmission gear mechanism 30 decline as shown by double-dotted line. This makes the automatic transmission 1 prolong an actual shifting time Tr and bring it close to the target shifting time Tt.

Figure 11:
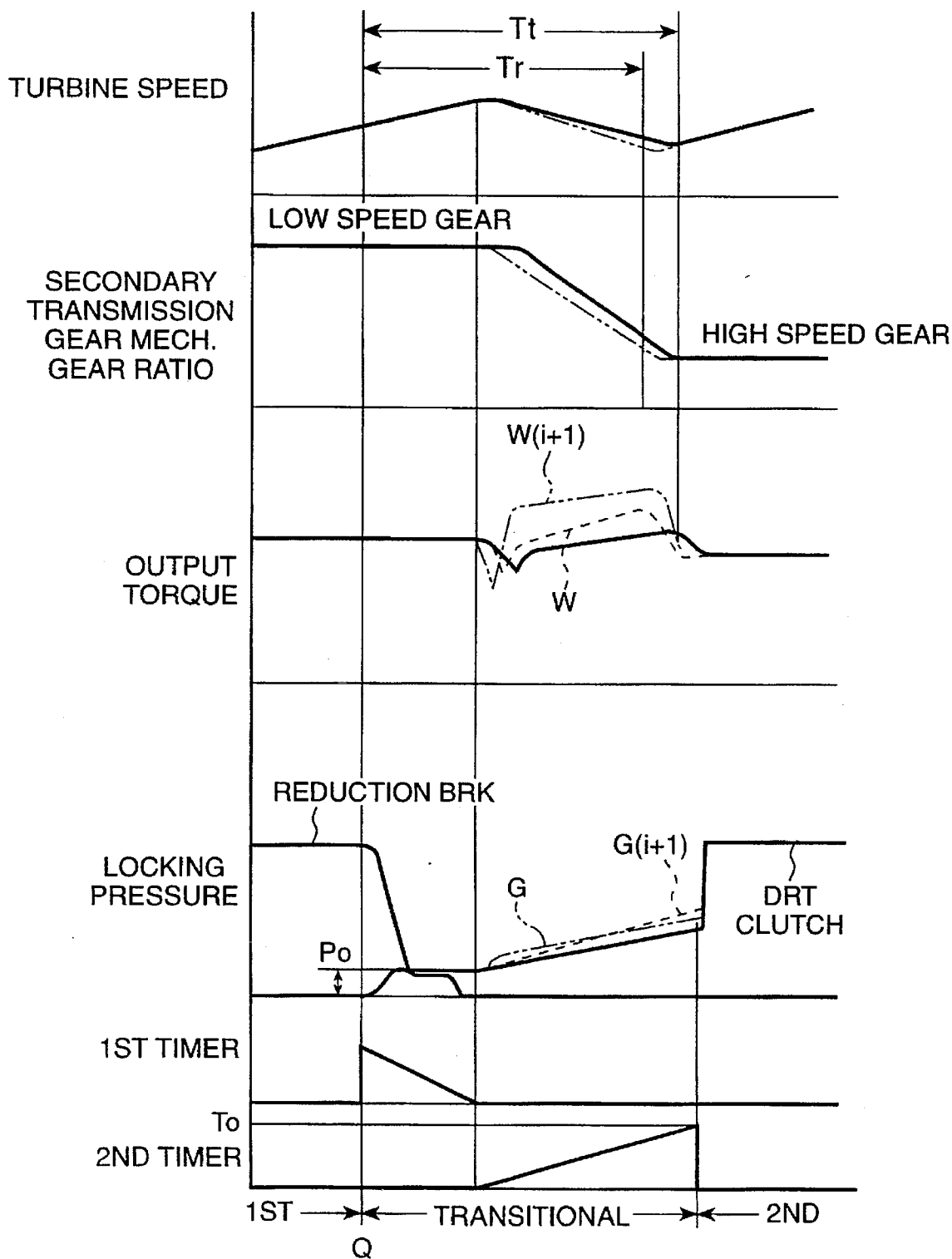

Referring to FIG. 11, if an actual shifting time Tr is longer than the target shifting time Tt, the gradient coefficient of transitional pressure level β is increased so as to curtail the actual shifting time Tr. In this instance, when the gradient coefficient of transitional pressure level β is increased in excess beyond the maximum gradient coefficient βo, a learning control is conducted for the correction of the transitional pressure level in place of the correction of the gradient coefficient of transitional pressure level β. That is, a corrective value Δα is set as a learning transitional pressure level α according to the shifting time difference ΔT. Specifically, when an actual shifting time Tr is longer than the target shifting time Tt, the gradient at which the locking pressure P gradually increases from the initial locking pressure Po is more sharp as indicated by a mark G. Resulting from such a sharp gradient, the output shaft provides an output torque having a sharply inclined wave form as indicated by a mark W due to the sharp increase in transitional pressure level, so as to cause enhanced shift shocks.

Contradistinctively, elevating of the transitional pressure level of locking pressure as indicated by a mark G(i+1) causes the ratio of speed reduction of turbine 13 and the ratio of gear ratio change of secondary transmission gear mechanism 30 to be more sharp as shown by double-dotted line. This makes the automatic transmission 1 shorten an actual shifting time Tr and bring it close to the target shifting time Tt. In addition, the output shaft provides an output torque having a approximately flat wave form as indicated by a mark W(i+1), so as to alleviate shift shocks.

If learning transitional pressure level α takes a minus value, it is corrected in learning control preferentially over the gradient coefficient of transitional pressure level, and if a learning transitional pressure level α is zero (0), the gradient coefficient of transitional pressure level β is corrected in learning control. Consequently, enhanced shift shocks, due to a transitional pressure level which is elevated in excess, are alleviated.

Figure 12:
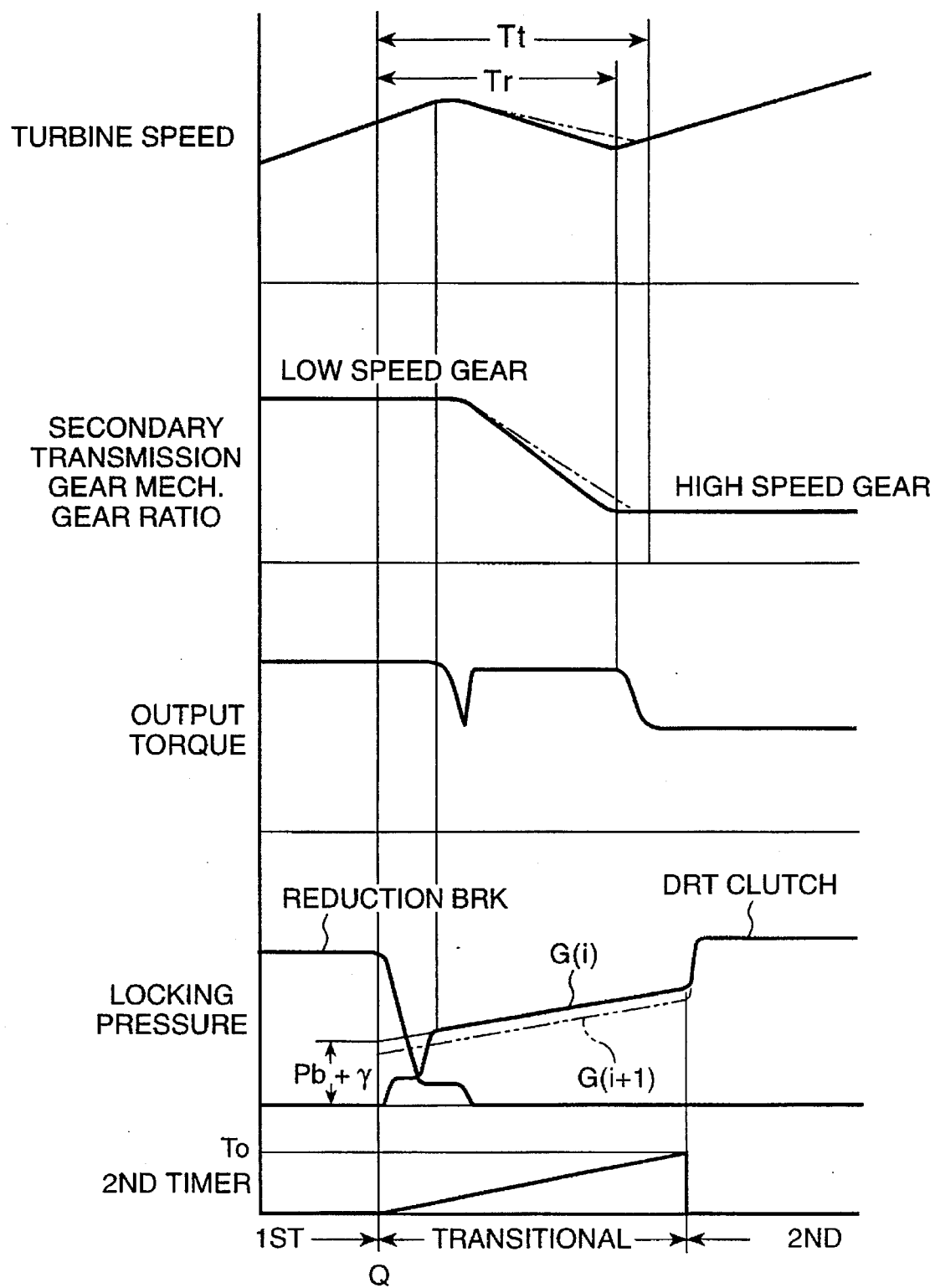
FIG. 12 is a time chart illustrating a pressure control for small engine throttle openings.

Referring to FIG. 12, on the other hand, if an engine throttle opening Th is larger than the critical engine throttle opening Tho, the first to fifth solenoids 71–75 change in operational pattern from the 1st operational pattern to the transitional operational pattern at the time of a 1–2 shift command signal Q. Then, the second linear solenoid valve 103 regulates a locking pressure P to be introduced into the secondary direct coupling clutch 32 at its first pressure chamber 32a to the basic initial locking pressure Pb with an addition of a learning transitional pressure level τ. Following the start of counting up of the critical To by the second timer upon the appearance of a 1–2 shift command signal Q, the locking pressure P to be introduced into the secondary direct coupling clutch 32 at its first pressure chamber 32a gradually increases at a gradient corresponding to the gradient coefficient of transitional pressure level σ as indicated by a mark G(i). In this instance, if an actual shifting time Tr is shorter than the target shifting time Tt, the learning transitional pressure level τ becomes smaller as compared with the present level. As a result, during another 1–2 gear shift, the locking pressure for the secondary direct coupling clutch 32 gradually increases while keeping its level, as indicated by a mark G(i+1), lower than the level during the previous 1–2 gear shift and hence, the ratio of speed reduction of turbine 13 and the ratio of a gear ratio change of secondary transmission gear mechanism 30 decline as shown by a double-dotted line. This makes the automatic transmission 1 prolong an actual shifting time Tr and bring it close to the target shifting time Tt.

It is to be understood that although the present invention has been described in detail with respect to a preferred embodiment thereof, various other embodiments and variants may occur to those skilled in the art which fall within the scope and spirit of the invention. Such other embodiment and variants are intended to be covered by the following claims.

What is claimed is:

1. A gear shift control system for an automatic transmission having a plurality of hydraulically operated frictional elements which are selectively locked and unlocked with a locking pressure changed according to engine output conditions so as to automatically shift gear, said gear shift control system comprising:

pressure control means for gradually changing a locking pressure at a rate so as to lock a specific one of said frictional coupling elements, thereby causing a specific gear shift in said automatic transmission;

engine output detecting means for detecting an engine output; and learning control means for detecting a shifting time required to complete said specific gear shift and, when an engine output detection less than a specified engine output is made by said engine output detecting means, correctively changing said rate according to a shifting time difference between said shifting time and a target shifting time so as to cause another said specific gear shift for said target shifting time.

2. A gear shift control system as defined in claim 1, wherein said learning control means changes an initial pressure level from which said pressure control means gradually changes said locking pressure according to said engine operating condition.

3. A gear shift control system as defined in claim 1, wherein said learning control means changes said rate only when said rate is less than a predetermined rate.

4. A gear shift control system as defined in claim 1, wherein said learning control means further correctively changes, on an engine output detection greater than said specified engine output by said engine output detecting means, an initial pressure level from which said pressure control means gradually changes said locking pressure according to said shifting time difference so as to cause another said specific gear shift for said target shifting time.

5. A gear shift control system as defined in claim 1, wherein said learning control means changes an initial pressure level from which said pressure control means gradually changes said locking pressure according to said engine operating condition when said rate after said correction is greater than a specific rate.

6. A gear shift control system as defined in claim 1, wherein said engine output detecting means detects an engine throttle valve opening.

7. A gear shift control system for an automatic transmission having a plurality of hydraulically operated frictional elements which are selectively locked and unlocked to automatically perform gear shifts with a locking pressure which is changed according to engine output conditions so as to automatically perform a gear shift, said gear shift control system comprising:

pressure control means for gradually changing a locking pressure at a rate so as to lock a specific one of said frictional elements, thereby causing a specific gear shift in said automatic transmission; and learning control means for detecting a shifting condition required to complete said specific gear shift and correctively changing said rate according to a difference in gear shift between said shifting condition and a target shifting condition so as to cause another specific gear shift for said target shifting condition;

wherein said learning control means changes said rate only when said rate is less than a predetermined rate.

8. A gear shift control system for an automatic transmission having a plurality of hydraulically operated frictional elements which are selectively locked and unlocked to automatically perform gear shifts with a locking pressure which is changed according to engine output conditions so as to automatically perform a gear shift, said gear shift control system comprising:

pressure control means for gradually changing a locking pressure at a rate so as to lock a specific one of said frictional elements, thereby causing a specific gear shift in said automatic transmission; and learning control means for detecting a shifting condition required to complete said specific gear shift and correctively changing said rate according to a difference in gear shift between said shifting condition and a target shifting condition so as to cause another specific gear shift for said target shifting condition;

wherein said learning control means further correctively changes, when an engine output is greater than a specified engine output, an initial pressure level from which said pressure control means gradually changes said locking pressure according to said difference in gear shift so as to cause another specific gear shift for said target shifting condition.

9. A gear shift control system as defined in claim 8, wherein said learning control means changes said rate only when said rate is less than a predetermined rate.

10. A gear shift control system as defined in claim 8, wherein said engine output is represented by an engine throttle valve opening.

11. A gear shift control system for an automatic transmission having a plurality of hydraulically operated frictional elements which are selectively locked and unlocked to automatically perform gear shifts with a locking pressure which is changed according to engine output conditions so as to automatically perform a gear shift, said gear shift control system comprising:

pressure control means for gradually changing a locking pressure at a rate so as to lock a specific one of said frictional elements, thereby causing a specific gear shift in said automatic transmission; and learning control means for detecting a shifting condition required to complete said specific gear shift and correctively changing said rate according to a difference in gear shift between said shifting condition and a target shifting condition so as to cause another specific gear shift for said target shifting condition;

wherein said learning control means changes an initial pressure level from which said pressure control means gradually changes said locking pressure according to said engine operating conditions when said rate, after correction, is greater than a predetermined rate.

* * * * *